United States Patent
Kuan et al.

(10) Patent No.: US 8,622,603 B1
(45) Date of Patent: Jan. 7, 2014

(54) BACKLIGHT MODULE

(71) Applicants: Yu-Chieh Kuan, Hsin-Chu (TW);
Yung-Chih Liu, Hsin-Chu (TW)

(72) Inventors: Yu-Chieh Kuan, Hsin-Chu (TW);
Yung-Chih Liu, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 0 days.

(21) Appl. No.: 13/656,811

(22) Filed: Oct. 22, 2012

(30) Foreign Application Priority Data

Jun. 29, 2012 (TW) .............................. 101123522 A

(51) Int. Cl.
*F21V 7/04* (2006.01)
(52) U.S. Cl.
USPC ........... 362/619; 362/600; 362/613; 362/615; 362/617; 362/621
(58) Field of Classification Search
USPC .................................................. 362/600–622
See application file for complete search history.

(56) References Cited

U.S. PATENT DOCUMENTS

| 2005/0254260 A1 | 11/2005 | Li |
| 2006/0126361 A1 | 6/2006 | Chang et al. |
| 2007/0139967 A1* | 6/2007 | Peng .............................. 362/617 |

FOREIGN PATENT DOCUMENTS

| TW | M268608 | 6/2005 | |
| TW | I251701 | 3/2006 | |
| TW | 200641470 | 12/2006 | |
| TW | M306335 | 2/2007 | |
| TW | 200725080 | 7/2007 | |
| TW | 201017286 | * 5/2010 | .............. G02F 1/335 |

* cited by examiner

*Primary Examiner* — Donald Raleigh
(74) *Attorney, Agent, or Firm* — WPAT, PC; Justin King

(57) ABSTRACT

A backlight module includes a light source, a light guide plate and at least one optical film. The light source has a plurality of light emitting devices. The light guide plate includes a light entrance portion, a main body portion and at least one positioning structure. The light entrance portion has a top surface and a light entrance surface. The light source is disposed corresponding to the light entrance surface. The top surface is adjacently connected to the light entrance surface. The main body is connected to the light entrance portion and has a first light extraction surface connecting the top surface. The positioning structure is disposed on the top surface and corresponding to an interval between two adjacent light emitting devices, and has an accommodating space. The optical film is disposed above the light guide plate and has at least one protruding portion disposed in the accommodating space.

10 Claims, 9 Drawing Sheets

BACKLIGHT MODULE

TECHNICAL FIELD

The present invention relates to a backlight module, and more particularly to a backlight module having a positioning structure for optical films.

BACKGROUND

While electronic industry keeps developing, liquid crystal displays (LCDs) have become the mainstream of present market. Since the LCD panel is not a self-emitting device, a backlight module is needed to provide light to the LCD panel, thus achieving the purpose of image displaying.

According to some requirements coming from the market, the design trend of bezel for LCD module is towards narrower and the LCD module keeps enlarging its size and widening its viewing angle. Such requirements have to be taken into the consideration on designing of the components in the backlight module. For example, in order to install optical films to the backlight module, positioning structures (such as fixing corners) are disposed on the frame of the backlight module for fixing and positioning the optical films, and avoiding the displacement of the optical films which leads to downgrade of the optical performance.

However, the above mentioned fixing corners on the frame are usually located at two sides of the LCD module. When the backlight module is illuminating, shadows are formed by the fixing corners on the two sides of the screen of the LCD module. Such shadows directly affect the displaying quality of the LCD module.

SUMMARY

The present invention provides a backlight module including a light source, a light guide plate and at least one optical film. The light source has a plurality of light emitting devices. The light guide plate includes a light entrance portion, a main body portion and at least one positioning structure. The light entrance portion has a top surface and a light entrance surface. The light source is disposed corresponding to the light entrance surface. The top surface is adjacently connected to the light entrance surface. The main body portion is connected to the light entrance portion and has a first light extraction surface, and the first light extraction surface is connected to the top surface. The at least one positioning structure is disposed on the top surface of the light entrance portion. The positioning structure is disposed corresponding to an interval between two adjacent light emitting devices. The positioning structure has an accommodating space. The at least one optical film is disposed above the light guide plate. The optical film has at least one protruding portion disposed in the accommodating space.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
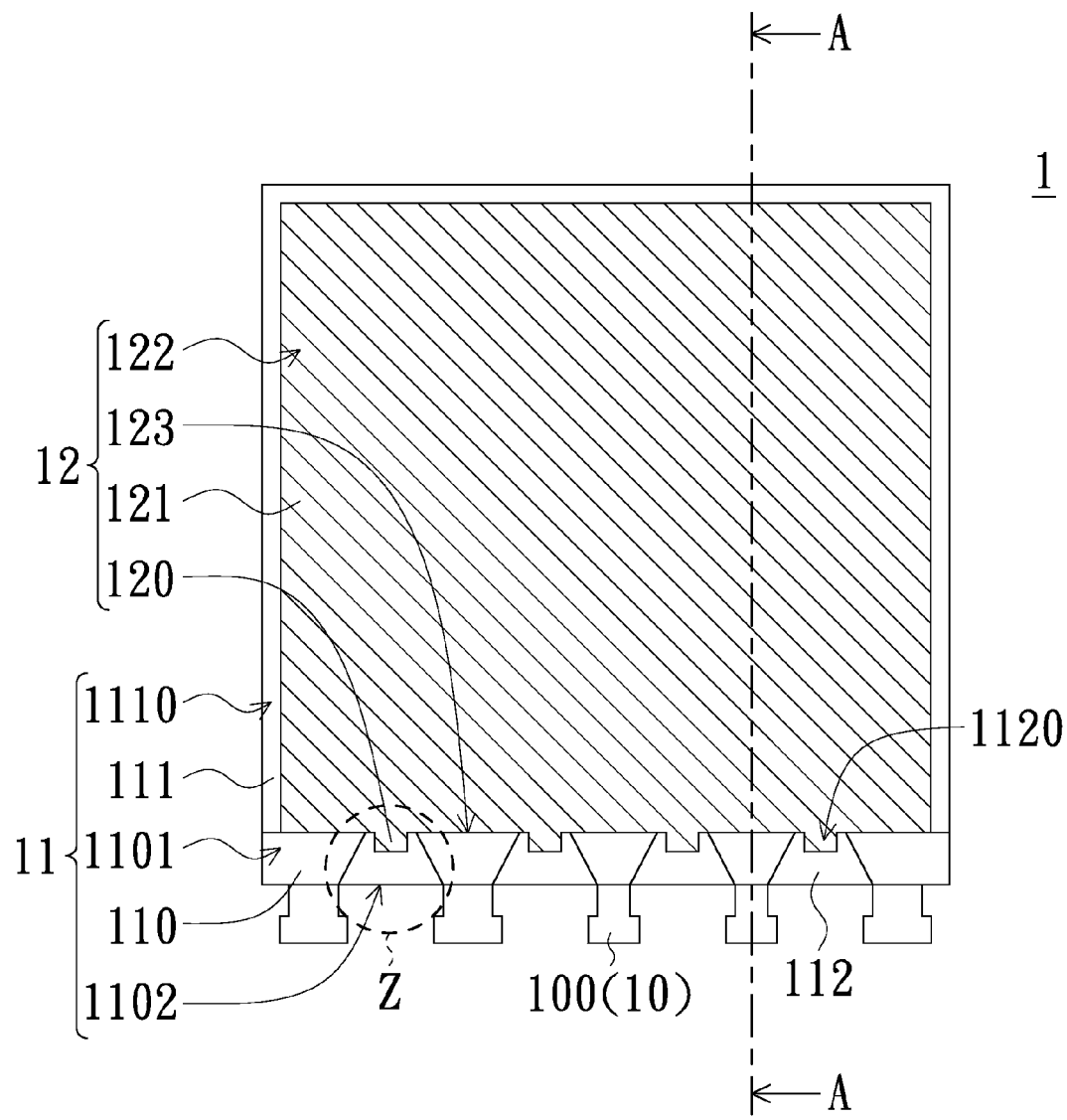
FIG. 1 is a top view of a backlight module according to an embodiment of the present invention.

Referring to FIG. 1, which is a top view of a backlight module according to an embodiment of the present invention. As FIG. 1 shows, the backlight module 1 includes a light source 10, a light guide plate 11 and at least one optical film 12. The light source 10 has a plurality of light emitting devices 100. The light guide plate 11 includes a light entrance portion 110, a main body portion 111 and at least one positioning structure 112. The light entrance portion 110 has a top surface 1101 and a light entrance surface 1102. The light source 10 is disposed corresponding to the light entrance surface 1102. The top surface 1101 is adjacently connected to the light entrance surface 1102. The main body portion 111 is connected to the light entrance portion 110. The main body portion 111 has a first light extraction surface 1110. The first light extraction surface 1110 is connected to the top surface 1101 of the light entrance portion 110. The positioning structure 112 is arranged on the top surface 1101 of the light entrance portion 110. The positioning structure 112 is disposed corresponding to an interval between two adjacent ones of the light emitting devices 100. The positioning structure 112 has an accommodating space 1120. The optical film 12 is disposed above the light guide plate 11. The optical film 12 has at least one protruding portion 120. The protruding portion 120 is disposed in the accommodating space 1120 of the positioning structure 112.

In this embodiment of the backlight module 1, since the positioning structure 112 is disposed corresponding to the interval between the two adjacent ones of the light emitting devices 100, the structure design has an advantage that the positioning structure 112 does not block the light emitted from the light emitting device 100, thus avoiding the shadows formed by the positioning structure 112 blocking the light emitted from the light emitting device 100.

Following the mentioned above, as FIG. 1 shows, the optical film 12 of this embodiment further has a base plate 121. The base plate 121 has a second light extraction surface 122 and a side surface 123 connecting to the second light extraction surface 122. The protruding portion 120 of the optical film 12 is, for example, located at the side surface 123, but not limited thereto in the present invention. Besides, the number of the protruding portions 120 of the optical film 12 is four in this figure. For accommodating the protruding portions 120, the number of the positioning structures 112 is also four in this figure, but not limited thereto in the present invention.

The increase and decrease of the number of the positioning structures 112 depend on the number of the protruding portions 120. In other words, if the number of the protruding portion 120 is one, then the number of the positioning structure 112 is also one.

Figure 2:
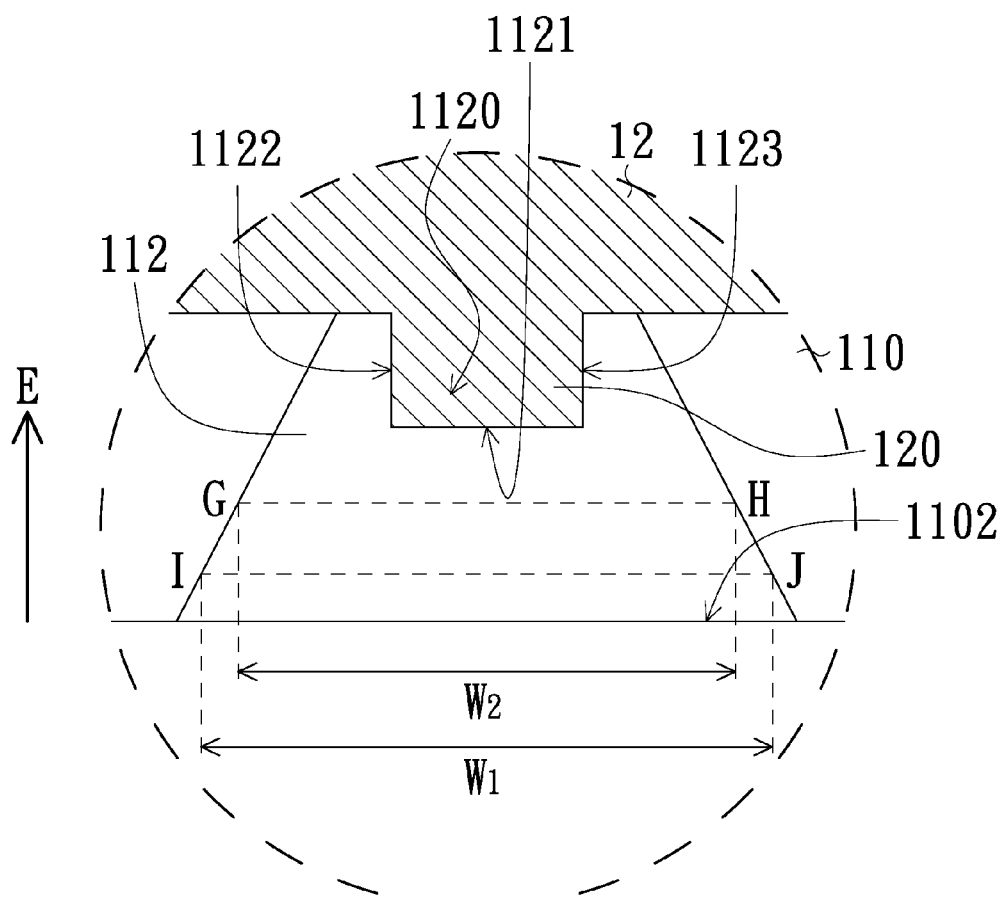
FIG. 2 is a magnified view of an area circled by dashed line Z in FIG. 1.

Referring to FIG. 2, which is a magnified view of an area circled by dashed line Z in FIG. 1. As FIG. 2 shows, the positioning structure 112 further has a first surface 1121, a second surface 1122 and a third surface 1123. The second surface 1122 and the third surface 1123 respectively extend from two ends of the first surface 1121 and along the direction toward the main body portion 111 of the light guide plate 11. The first surface 1121, the second surface 1122 and the third surface 1123 of the positioning structure 112 define the accommodating space 1120. As FIG. 2 shows, in this embodiment, the first surface 1121, the second surface 1122 and the third surface 1123 of the positioning structure 112 are, for example, in a U-shaped arrangement.

Figure 3:
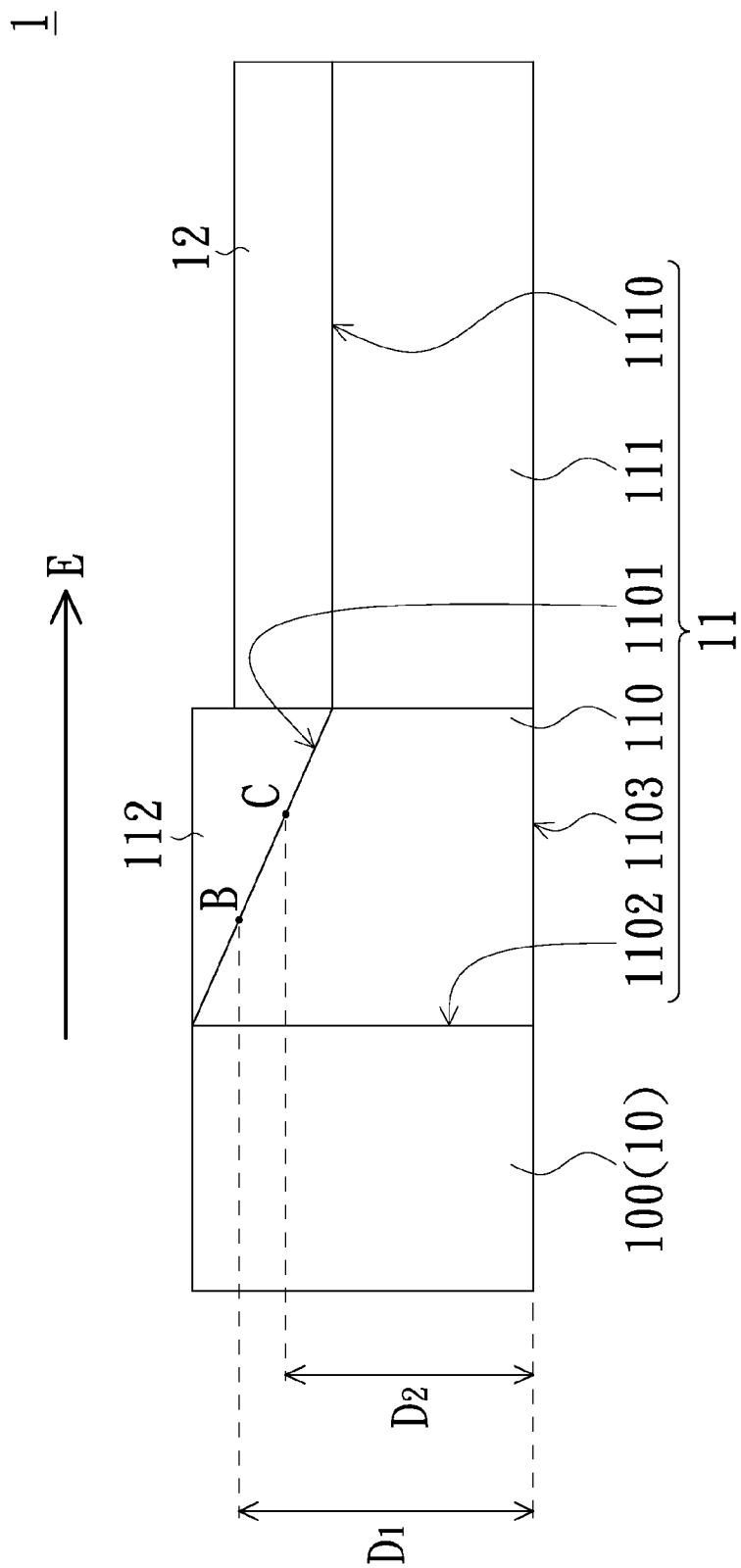
FIG. 3 is a cross sectional view along a line A-A in FIG. 1.

Referring to FIG. 3, which is a cross sectional view along a line A-A in FIG. 1. As FIG. 3 shows, in this embodiment of the backlight module 1, the light entrance portion 110 further has a bottom surface 1103 opposite to the top surface 1101. The distance between the bottom surface 1103 and the top surface 1101 for example gradually decreases along the direction E away from the light entrance surface 1102. For example, as FIG. 3 shows, the distance between a point B on the top surface 1101 of the light entrance portion 110 and the bottom surface 1103 of the light entrance portion 110 is D1, and the distance between a point C on the top surface 1101 of the light entrance portion 110 and the bottom surface 1103 of the light entrance portion 110 is D2. As can be clearly seen in FIG. 3, the distance D1 between the top surface 1101 of the light entrance portion 110 and the bottom surface 1103 is greater than the distance D2. The distance D1 between the top surface 1101 of the light entrance portion 110 and the bottom surface 1103 gradually decreases to the distance D2 along the direction E away from the light entrance surface 1102. More specifically, the top surface 1101 of the light entrance portion 110 is, for example, an inclined surface. The shape of the light entrance portion 110 in FIG. 3 is merely one of the embodiments of the present invention, and not limited thereto in the present invention.

Please refer to FIG. 2 and FIG. 3 again. As FIG. 3 shows, the positioning structures 112 of this embodiment, for example, protrude from the top surface 1101 of the light entrance portion 110. As FIG. 2 shows, the width of the positioning structure 112 gradually decreases along the direction E away from the light entrance surface 1102. For example, as FIG. 2 shows, the length of the line segment I-J represents the first width W1 of the positioning structure 112 and the length of the line segment G-H represents the second width W2 of the positioning structure 112. As can be clearly seen in FIG. 2, the first width W1 of the positioning structure 112 is greater than the second width W2. The first width W1 of the positioning structure 112 gradually decreases to the width W2 along the direction E away from the light entrance surface 1102. The shape of the positioning structure 112 is merely one of the embodiments of the present invention, and not limited thereto in the present invention.

Figure 4:
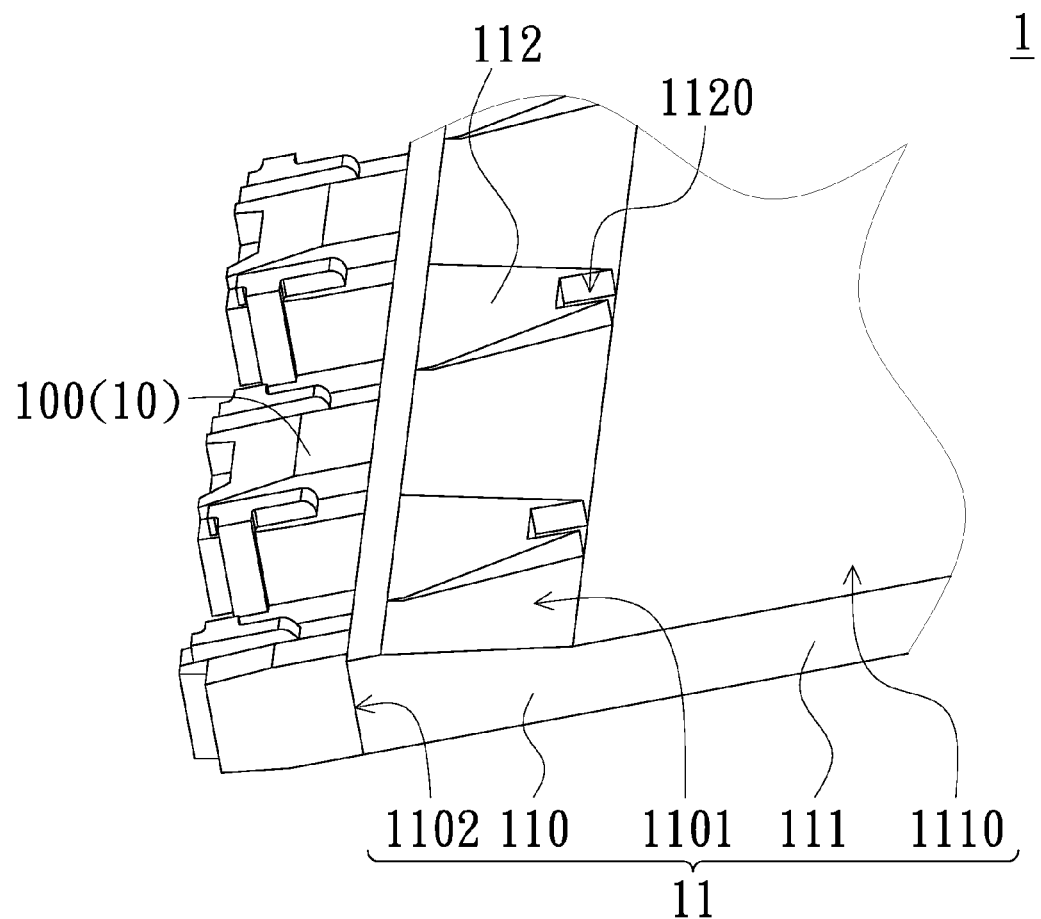
FIG. 4 is a three-dimensional view showing the structure of the backlight module according to the embodiment of the present invention.

In order to more clearly show the structure of every components of the backlight module 1 and the positioning relationship thereof in this embodiment, the structure of the backlight module 1 of this embodiment can be referred to a three dimensional view in FIG. 4. It should be mentioned that in this figure, in order to clearly demonstrate the outer appearance of the positioning structure 112 and the positioning relationship between the positioning structure 112 and the other components, the optical film 12 is omitted. The connecting relationship between the optical film 12 and the positioning structure 112 can be specifically described in FIG. 1 and other embodiments below.

Figure 5A:
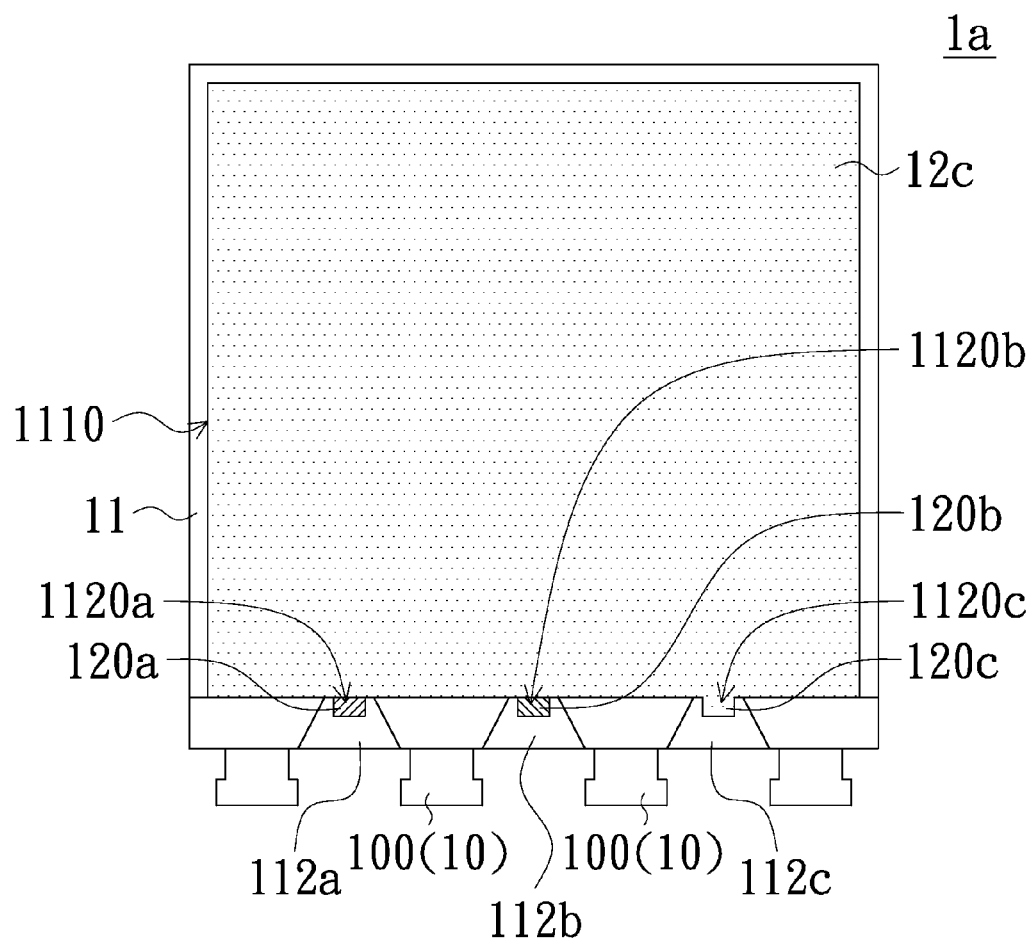
FIG. 5A is a top view of the backlight module according to another embodiment of the present invention.
Figure 5B:
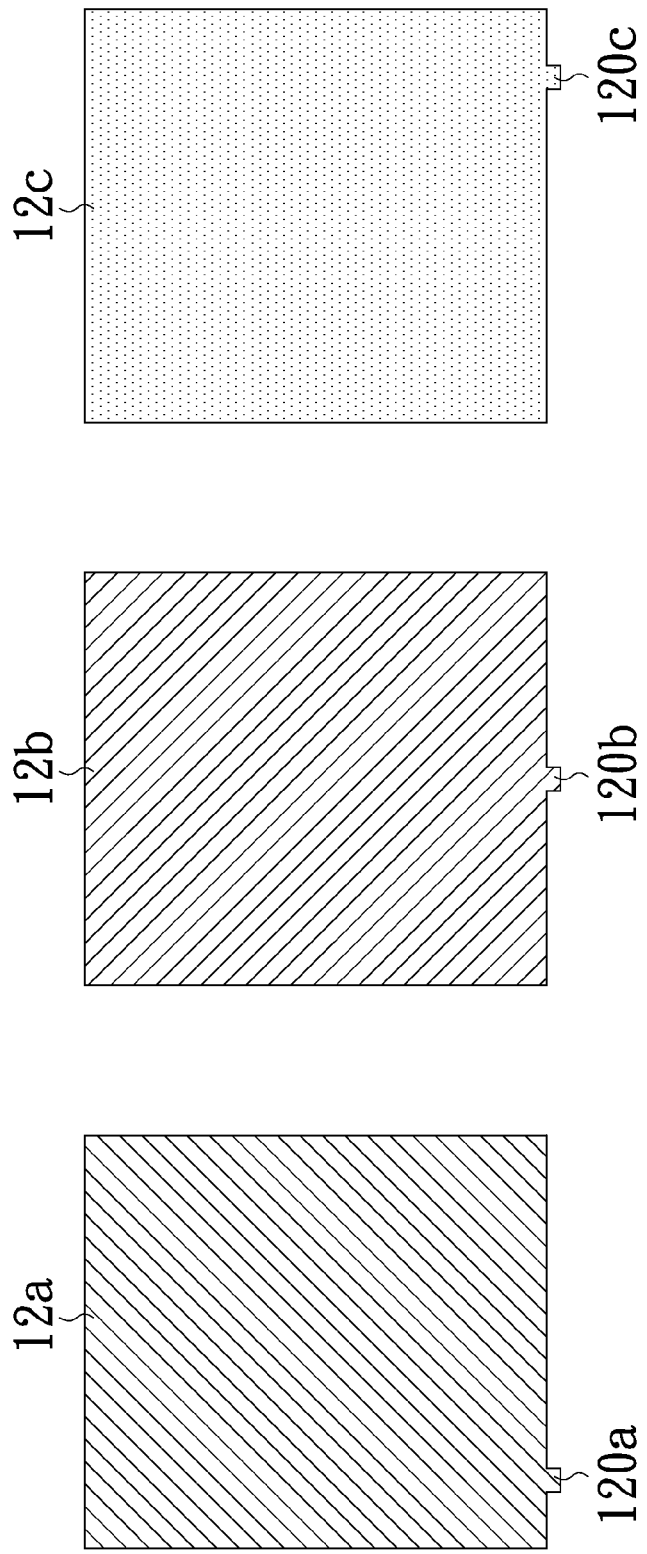
FIG. 5B is a top view showing each one of the optical films in FIG. 5A.

Referring to FIG. 5A and FIG. 5B, FIG. 5A is a top view of the backlight module according to another embodiment of the present invention. FIG. 5B is top view showing each one of the optical films in FIG. 5A. The backlight module 1a of this embodiment is similar to the backlight module 1 in FIG. 1. The difference is that, as shows in FIG. 5B, the backlight module 1a of this embodiment includes a plurality of optical films 12a, 12b, and 12c. The dimensions of the optical films 12a, 12b, and 12c are, for example, substantially the same. The optical films 12a, 12b, and 12c have protruding portions 120a, 120b, and 120c, respectively. As FIG. 5A shows, the backlight module 1a of this embodiment includes positioning structures 112a, 112b, and 112c. The optical films 12a, 12b, 12c are sequentially stacked from bottom to top on the light extraction surface 1110 of the light guide plate 11 (the optical film 12c is the top optical film). The protruding portion 120a of the optical film 12a is disposed in the accommodating space 1120a of the positioning structure 112a. The protruding portion 120b of the optical film 12b is disposed in the accommodating space 1120b of the positioning structure 112b. The protruding portion 120c of the optical film 12c is disposed in the accommodating space 1120c of the positioning structure 112c. In other words, the accommodating space of one of the positioning structures 112a, 112b and 112c only accommodates the protruding portion of one of the optical films 12a, 12b and 12c. Therefore, after the optical films 12a, 12b and 12c are sequentially stacked, it can be clearly recognized that the protruding portions 120a, 120b and 120c of the optical films 12a, 12b and 12c are respectively and securely fixed by the positioning structures 112a, 112b and 112c. There is not any one of the optical films which is neglected to be fixed. The other components in this figure are the same as FIG. 1 shows and thus not repeated herein.

Figure 6A:
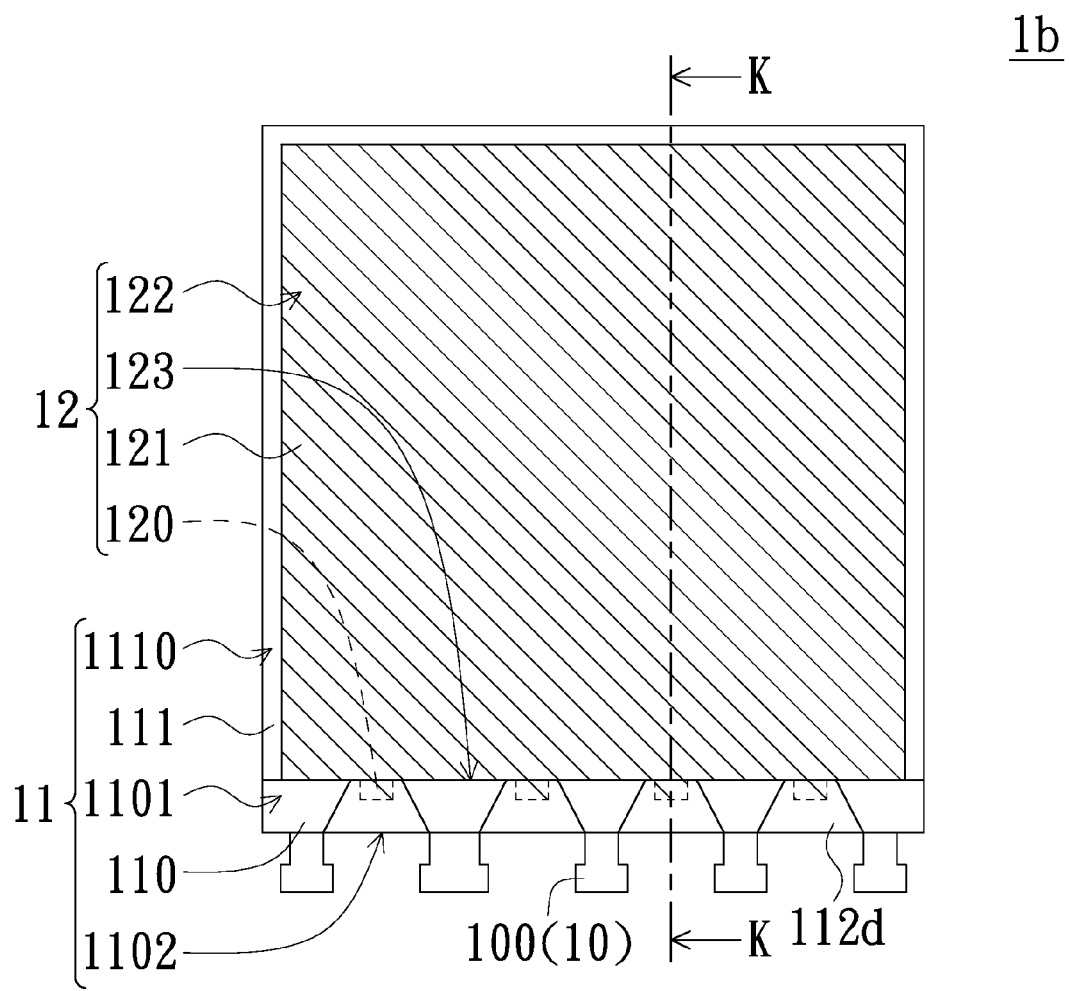
FIG. 6A is a top view of the backlight module according to another embodiment of the present invention.
Figure 6B:
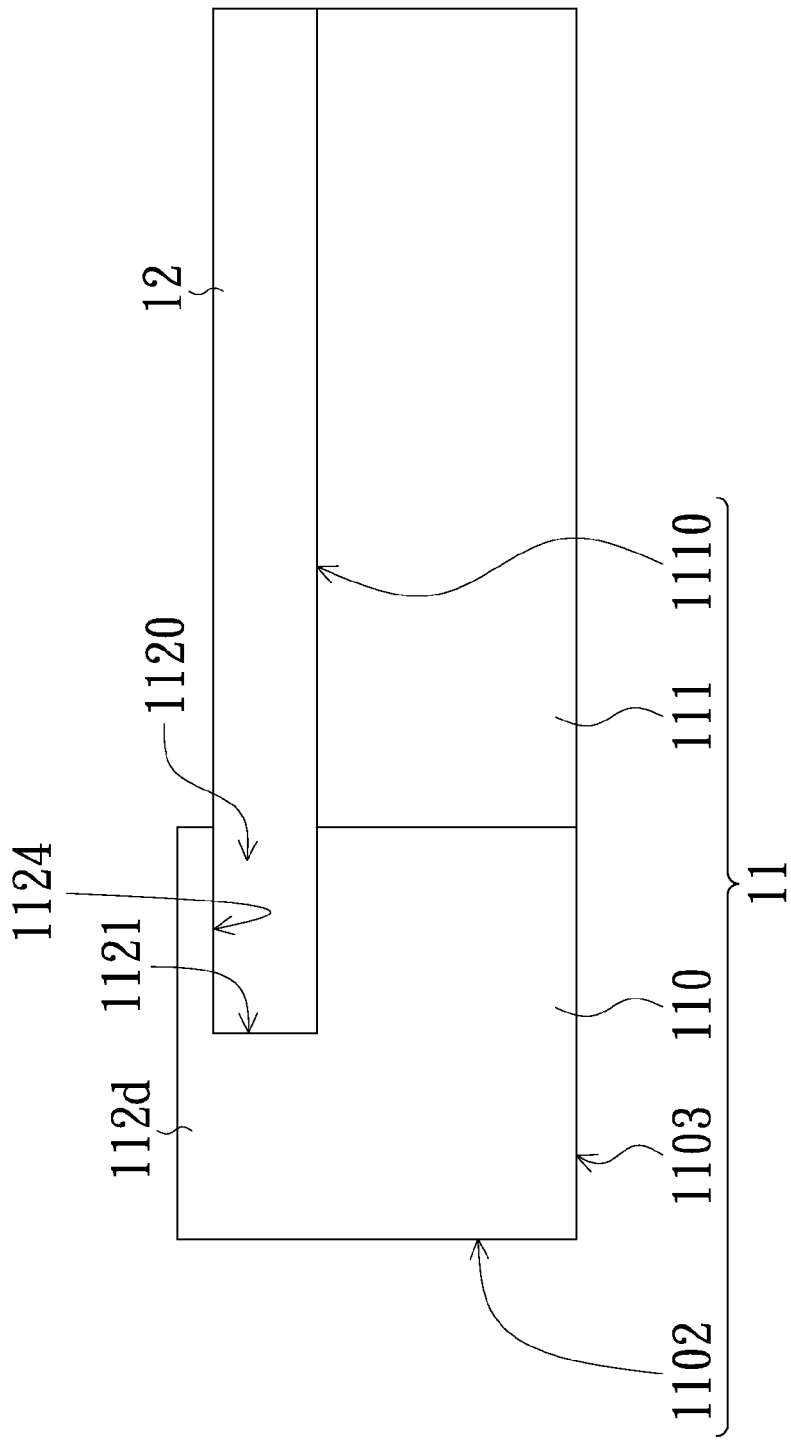
FIG. 6B is a cross sectional view along a line K-K in FIG. 6A.

Referring to FIG. 6A and FIG. 6B, FIG. 6A is a top view of the backlight module according to another embodiment of the present invention. FIG. 6B is a cross sectional view along a line K-K in FIG. 6A. As FIG. 6B shows, the backlight module 1b of the embodiment is similar to the backlight module 1 in FIG. 1. The difference is that the positioning structure 112d of the backlight module 1b further has a fourth surface 1124. The fourth surface 1124 is connected to the first surface 1121, the second surface 1122 and the third surface 1123 (the second surface 1122 and the third surface 1123 shown as FIG. 2). The fourth surface 1124 overlaps the protruding portion 120 of the optical film 12. The advantage of the fourth surface 1124 of the positioning structure 112d of this embodiment is that when the protruding portion 120 of the optical film 12 is disposed in the accommodating space 1120 of the positioning structure 112d, since the fourth surface 1124 overlaps the protruding portion 120 of the optical film 12, the optical film 12 is more firmly fixed on the first light extraction surface 1110 of the light guide plate 11.

Figure 7:
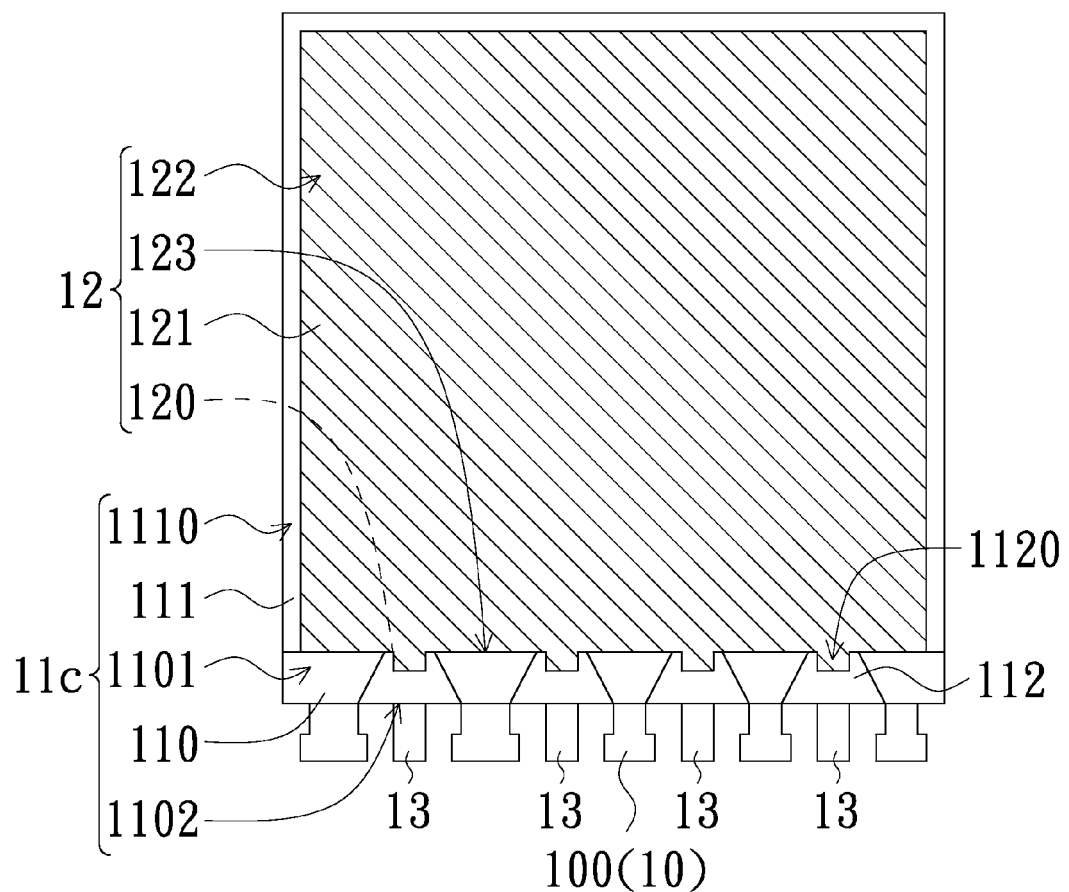
FIG. 7 is a top view of the backlight module according to another embodiment of the present invention.

Referring to FIG. 7, which is a top view of the backlight module according to another embodiment of the present invention. As FIG. 7 shows, the backlight module 1c is similar to the backlight module 1 in FIG. 1. The difference is that the light guide plate 11c of the backlight module 1c further includes a plurality of protruding structures 13. The protruding structures 13 are disposed on the light entrance surface 1102 of the light entrance portion 110. Each one of the light emitting devices 100 of the light source 10 is located between two adjacent ones of the protruding structures 13.

In conclusion, the backlight module disclosed by the embodiments of the present invention, in which the light guide plate has at least one positioning structure. The positioning structure is disposed on the top surface of the light entrance portion of the light guide plate, and the positioning structure is disposed corresponding to the interval between two adjacent ones of the light emitting devices. Under this structural design, the protruding portions of the optical films can be directly disposed in the accommodating spaces of the positioning structures. There is no need to dispose a position structure on the frame for fixing the optical film. Moreover, since the positioning structure is disposed corresponding to the interval between two adjacent ones of the light emitting devices, the positioning structures do not block the light emitted from the light emitting devices. Therefore, the shadows formed by the positioning structure on the frame can be avoided, the function of the alignment in assembly can be remained and the displacement of the optical films can be avoided.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A backlight module, comprising:
    a light source having a plurality of light emitting devices;
    a light guide plate comprising:
        a light entrance portion having a top surface and a light entrance surface, wherein the light source is disposed corresponding to the light entrance surface, and the top surface is adjacently connected to the light entrance surface;
        a main body portion connected to the light entrance portion and having a first light extraction surface, the first light extraction surface being connected to the top surface; and
        at least one positioning structure disposed on the top surface of the light entrance portion, the positioning structure being disposed corresponding to an interval between two adjacent ones of the light emitting devices, the positioning structure having an accommodating space; and
    at least one optical film disposed above the light guide plate, the optical film having at least one protruding portion, the protruding portion being disposed in the accommodating space.

2. The backlight module according to claim 1, wherein the positioning structure further has a first surface, a second surface and a third surface, the second surface and the third surface respectively extend from two sides of the first surface and along the direction toward the main body portion, and the first surface, the second surface and the third surface define the accommodating space.

3. The backlight module according to claim 2, wherein the positioning structure further has a fourth surface connected to the first surface, the second surface and the third surface, and the fourth surface overlaps the protruding portion of the optical film.

4. The backlight module according to claim 2, wherein the first surface, the second surface and the third surface are in a U-shaped arrangement.

5. The backlight module according to claim 1, wherein the optical film further has a base plate, the base plate has a second light extraction surface and a side surface connecting to the second light extraction surface, and the protruding portion of the optical films is located at the side surface.

6. The backlight module according to claim 1, wherein the numbers of the at least one optical film and the at least one positioning structure are respectively plural, and the accommodating space of each one of the positioning structures only accommodates the protruding portion of one of the optical films.

7. The backlight module according to claim 1, wherein the numbers of the at least one protruding portion of the optical film and the at least one positioning structure are respectively plural, and the protruding portions of the optical film are respectively disposed in the accommodating spaces of the positioning structures.

8. The backlight module according to claim 1, wherein the light guide plate further includes a plurality of protruding structures disposed on the light entrance surface of the light entrance portion, and each one of the light emitting devices is located between two adjacent ones of the protruding structures.

9. The backlight module according to claim 1, wherein the light entrance portion further includes a bottom surface opposite to the top surface, and the distance between the top surface and the bottom surface gradually decreases along a direction away from the light entrance surface.

10. The backlight module according to claim 1, wherein the positioning structure protrudes from the top surface of the light entrance portion, and the width of the positioning structure gradually decreases along the direction away from the light entrance surface.

* * * * *